July 8, 1947.　　A. MARS ET AL　　2,423,655
PIPE COUPLING OR JOINT
Filed June 5, 1944　　3 Sheets-Sheet 3

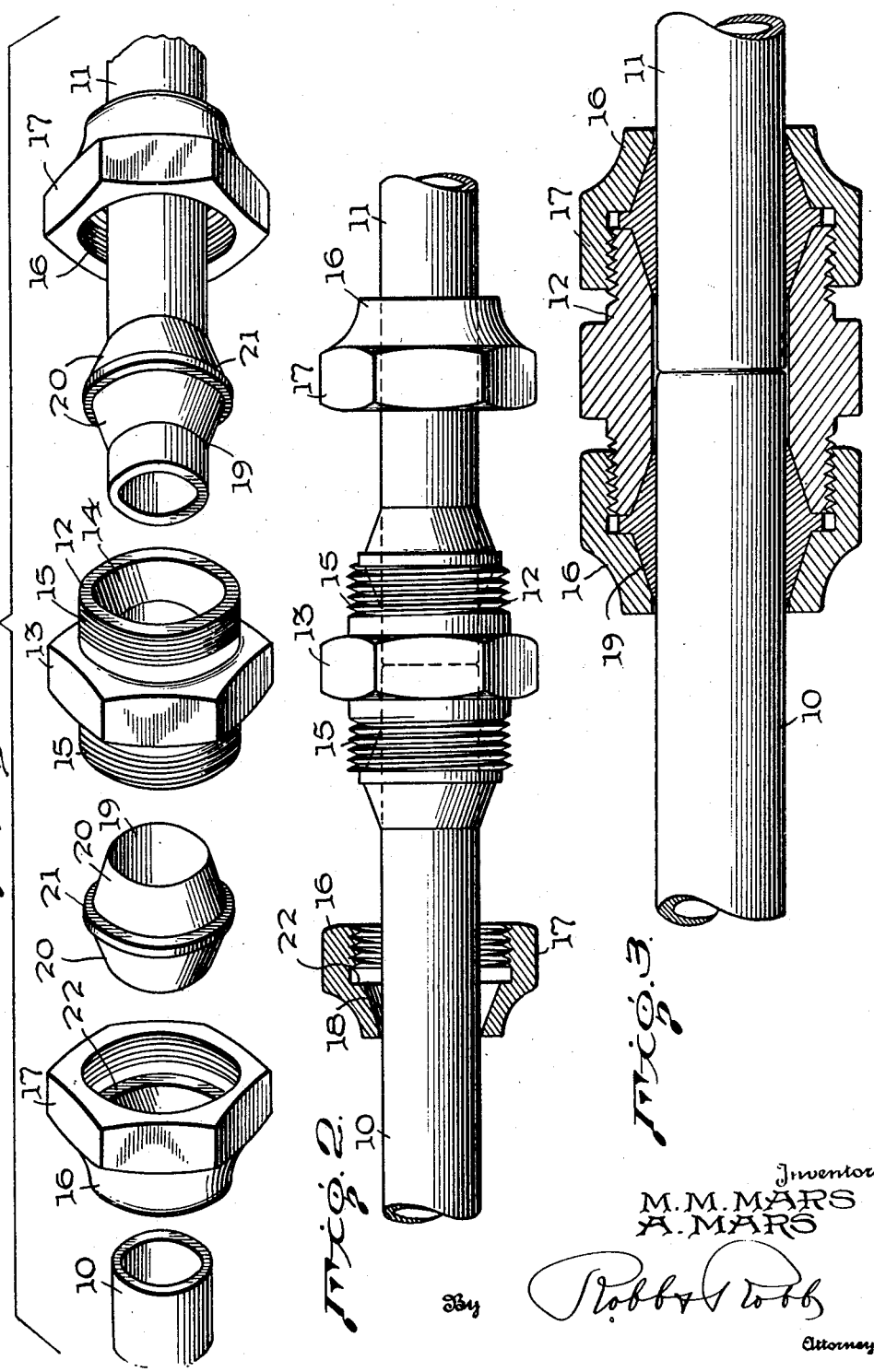

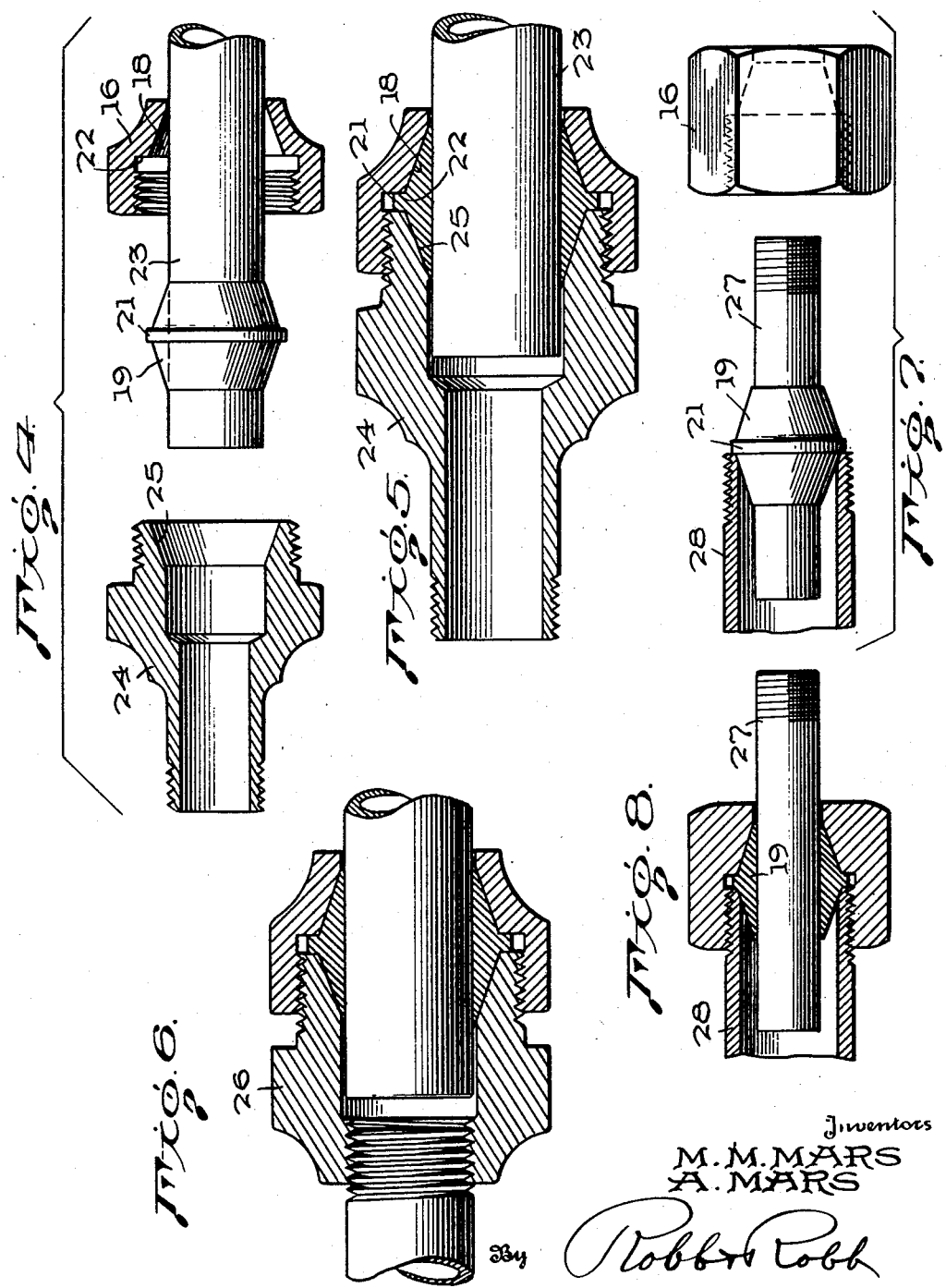

Inventors
M. M. MARS
A. MARS

By Robb & Robb
Attorneys

Patented July 8, 1947

2,423,655

UNITED STATES PATENT OFFICE 2,423,655

PIPE COUPLING OR JOINT

Albert Mars and Michael M. Mars,
Cleveland, Ohio

Application June 5, 1944, Serial No. 538,726

3 Claims. (Cl. 285—196)

1

This invention appertains to improvements in what are generally known as pipe couplings or joints including among others slip joint connections, waste and vent pipe couplings and the like.

The primary object of the invention is to provide a means for connecting separate pipe lines together without the necessity of threading the ends of the pipe, so as to form a permanent leak-proof joint which may be quickly and cheaply assembled, connected or disconnected, and applicable in principle to all types of pipe lines, such as water, oil, air or steam conduits, of the same or different standard sizes.

It is further an object in view to provide such a coupling as will eliminate the use of customary caulking and packing materials, such as rubber, wicking, paper gaskets, oakum, string, molten lead, or combinations of these, etc., which have the tendency to spring leaks in comparatively short periods of time due to ageing, shrinkage, vibration, defective workmanship in packing or caulking, expansion and contraction when lines carry hot and cold fluids, settling of the buildings in which the piping is installed and other like causes.

These and other objects are accomplished by the utilization of a specially preformed metallic packing ring or gasket readily compressible or deformable to engage the outer end surfaces of the pipes to be connected, in combination with cooperating coupling or compression members for exerting such pressure upon the ring as to enable the effective sealing of the joint so that it will withstand internal pressures as high as 100 lbs. or more.

One of the important features of this invention, a characteristic primarily of the particular form of the gasket element, resides in the method of providing a multiple seal against leakage at the joint when the invention is employed for connecting pipe lines or conduits of corresponding or different sizes. In carrying out this objective, the gasket is formed with an annular flange or collar against which the compression members abut or clamp so as to seal the fluid conveyed by the conduits against escape at the same time the compression of the gasket upon the surface of the pipe section or sections is made effective.

The material of which the gasket ring referred to above is made is preferably lead, or more strictly speaking, lead alloy, a basic material long known to the plumbing trade, it being sufficiently hard to provide a stable seal and yet soft enough to readily conform completely to the surfaces against which it is compressed. It thus becomes unnecessary to flange or otherwise deform the pipe ends themselves and thereby reduces the cost of installation. In fact, the coupling of this invention may be used in original or emergency repair installations and is capable of application

2 by unskilled labor, in a minimum amount of time, and with ordinary tools, without large destruction of surrounding barriers to enable removal or emplacement of pipe sections or shafts and threading the ends to be connected.

Other and further objects and advantages of the invention will be hereinafter described and the novel features thereof defined by the appended claims.

In the accompanying drawings:

Figure 1 is an exploded view of a multiple seal connection embodying the invention;

Figure 2 is an assembly view of the embodiment of Figure 1, one of the compression members being shown in section and the end compression members displaced from their seating positions to show more clearly the details of the connection elements;

Figure 3 is a sectional view of the embodiment of Figure 2, showing the parts in operative or sealing position of the joint;

Figure 4 is a view partly in section of the invention as applied to a male coupling, previous to connection of the compression members;

Figure 5 is a sectional view of the coupling of Figure 4 in operative or coupled position;

Figure 6 is a view similar to Figure 5 showing the application of the invention to a female coupling;

Fig. 7 is a sectional view showing still another application of the invention, as, for example, a faucet connection before the connection is completed;

Figure 8 is a sectional view of the embodiment of Figure 7 with the parts in operative or coupled position;

Like reference characters designate corresponding parts in the several figures of the drawings.

Figure 9:
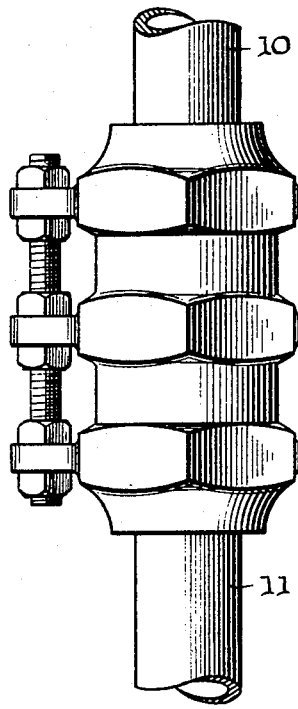
Figure 9 is a plan view of the invention as applied to a slip joint construction in full coupled position.

Referring to the drawings, and particularly to the embodiment of Figures 1, 2 and 3, the numerals 10 and 11 designate the end portions or sections of two pipes or conduits to be connected together by means of the coupling, which, in this instance, includes the nipple 12 constituting one of the compression members used in this multiple form of joint. This nipple, it should be understood, may be of the conventional type, that is plain-surfaced between its threaded ends, or the intermediate surface thereof may be knurled, ribbed, or provided with a wrench-hold 13, as shown in the drawing, depending upon whether it is desired to provide a connection which will take a pipe wrench or one which would permit the use of a monkey-wrench. Furthermore, this nipple connection in the use of the same in this invention is provided at each end with a conical seat 14, and, as above indicated, each end is suitably threaded at 15 to receive the correspondingly threaded end of the compression element or nut 16, there being one such nut for either end of the nipple. Each of these nuts is formed with the usual wrench-hold 17 at one end, and at its other or unthreaded end a conical seat 18 is provided and extending preferably from the end of the threads of the nut to a point close to the unthreaded end of the same.

The primary feature of this invention which enables the connection of two pipe sections, such as indicated at 10 and 11, without the threading of the ends thereof, resides in the use of the gasket or packing ring 19 shown clearly in each of the figures of the drawings to be provided with tapered ends conforming substantially in their angularity to the conical shape of the seats 18 in the compression members 12 and 16, these tapered extremities being designated 20, 20. Intermediate the tapered ends just referred to, the ring is provided with an annular flange or collar 21, which, as hereinafter set forth, provides a double seal for each of the coupling connections. In the form of the invention as disclosed in Figures 1 to 3, wherein the intermediate nipple is employed, one face of this flange 21 is adapted to seat upon an internal shoulder 22 formed intermediate the threads of each of the nuts 16 and the conical end seats 18 thereof, while the other or opposite face of the flange 21 abuts against the end face of the nipple 12, when the nuts 16 are drawn up tight.

Thus, in the assembly of the parts shown in Figure 1, one of the nuts 16 is first slid over the end section 10 of the pipe line. Following this, a gasket ring 19 is slipped into position upon said pipe end. The same disposition of these two parts is made with respect to the end section of the pipe 11. The nipple 12 is now slipped in between the pipes and the compression members or nuts referred to so as to occupy a position as shown in the central portion of Figure 2, the ends of the pipe sections 10 and 11 being brought into contiguous relation or closely so. The nuts 16 on each of these pipes are now screwed upon the respective ends of the nipple and compression of the gasket ring into sealing position is accomplished by screwing home these nuts to the position shown in Figure 3. In this action, the tapered or conical seating surfaces of each nut and gasket in the drawing action produces a compression of the gasket against the outer surfaces of the pipes 10 and 11 in a radial direction, the wedging force starting slowly and reaching maximum when the flange 21 of the gasket is brought into contact between the shoulder 22 of the nut and the end of the connecting nipple. Such compression action deforms the gasket both with respect to the conical seat portion as well as the annular flange 21, thereby producing a multiple seal due to deformation of the material of the gasket which is made to conform to any unevenness of the surface of the pipe or the seating shoulder of the nut and end of the nipple. With this double seal arrangement, it is possible to make a sealed joint even though the ends of the pipes 10 and 11 are not aligned with each other, and this becomes quite important when the pipe lines are run from two directions and fail to reach an exact concentric position at the connecting ends, or through settling of a building structure, for example, the pipes 10 and 11 become misaligned.

In the use of this arrangement of the coupling connection, it will be apparent that if the pipe lines within a wall or beneath a floor surface or elsewhere spring a leak, it is only necessary to open the barrier of these surrounding walls at the point of the leak and to cut out a piece of the pipe line where the leak has occurred to enable the introduction of this coupling device. As hereinbefore premised, it is not necessary to break open a large portion of the wall to permit the pipe sections to be unscrewed for rethreading, as is the case in the majority of instances of making repairs of leakage in pipe line installations. However, this invention, as described, is not intended to be confined to repairs of installations, but may be applied to original pipe lines at the joints of the same, in which event, the end portions of the pipe lines need not be threaded. This is of primary importance in the installation of very large pipe lines for conveying fluids, and particularly in instances of connection of shaftings or rods for lengthening or other purposes.

The same principle which has been described in connection with the arrangement of Figures 1 to 3 is employed in the form of construction disclosed in Figures 4 and 5, wherein the pipe 23 is to be joined to the male coupling 24. In this instance, the coupling 24 is provided with the tapered or conical end seat 25 to receive the conical face of the end of the gasket 19, while the compression nut 16 is screwed upon the threaded end of the coupling 24 and receives the other conical end of the gasket against its conical seat 18. The annular flange or collar 21 of the gasket is compressed between the end face of the coupling 24 and the shoulder 22 of the compression nut 16, all as shown clearly in the assembled view of Figure 5.

Figure 6 differs from Figure 5 only in that instead of the male coupling member in this instance, the coupling is made with the female member 26. No further description is believed necessary with respect to this form.

Figures 7 and 8 show the application of our invention to the connection between pipes of different sizes. In this arrangement, the small pipe 27 is inserted into the larger pipe 28, and the gasket 19 is then slid upon the small pipe so that its shoulder 21 will seat against the larger end of the pipe 28. The clamping nut 16 is then disposed over the end of the small pipe 27 and screwed upon the threaded end of the larger pipe 28, compressing between the pipe end and the conical seat of the nut 16, one conical end of the gasket 19 and the shoulder 21. This is the type of connection for a faucet which may be screwed upon the end of a small pipe 27, or such connection may constitute the joint between any small and large pipe in a pipe line.

Figure 10:
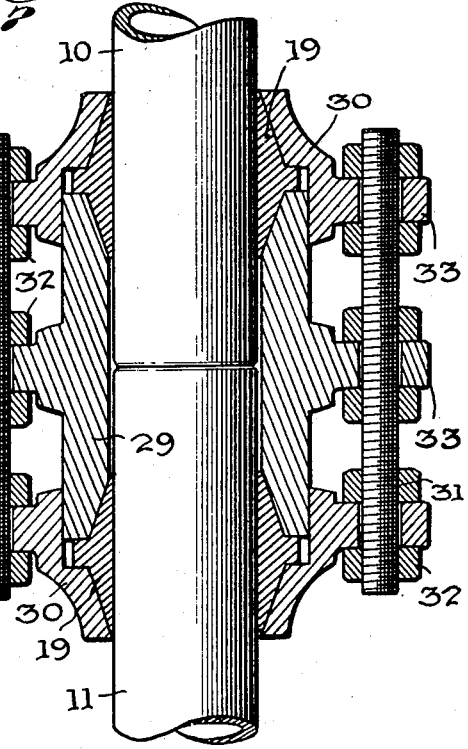
Figure 10 is an enlarged sectional view of the construction shown in Figure 9.
Figure 11:
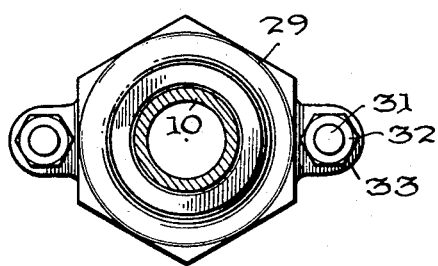
Figure 11 is an end view of one of the coupling members of the slip joint of Figure 9.
Figure 12:
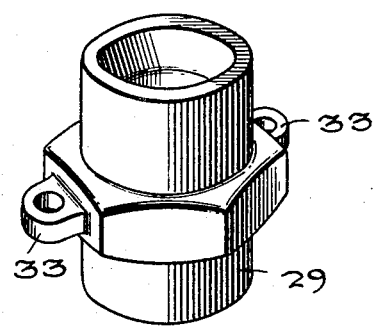
Figure 12 is a perspective view of one of the compression members of the slip joint construction.

As illustrating a further application of the invention, reference is now made to the slip joint construction shown in Figures 9 and 10. Here the intermediate member 29 of the joint coupling is provided at each end with an inner conical seat while the end compression members 30 are each formed with a corresponding conical seat so that as shown particularly in Figure 10, when a gasket 19 is disposed between the respective ends of the intermediate member 29 and the contiguous end compression member 30, the gasket is compressed against the ends of the pipes inserted into the joint, sealing these pipe ends against the surface of the pipe by the bonding action of the lead material of the gasket and providing a further sealing by means of the annular collar received between the compression shoulders of the end members and the intermediate member 29. It is needless to indicate that these elements of the slip joint construction are connected together by means of the bolts 31 and the lock-nuts 32 engaging at opposite sides of the ears 33 with which at least the end members of this coupling arrangement are provided. The intermediate member 29 may also be provided with ears and co-operating clamping nuts, as shown in the drawings, but obviously this construction is not required in the carrying out of the use of the slip joint.

In the foregoing description it is to be understood that where the term "pipe" or "pipe line" is employed in the appended claims, it is comprehended that shaft or rod sections may be used with equal force and effect, since the coupling device is designed to cooperate in the connection of any two elements of like general form.

By using or adopting the new type of connection herein specified in conjunction with the particular form of lead gasket, slip-shod and makeshift methods now commonly used in the plumbing industry in connecting unions and slip joint connections will be entirely eliminated. It is quite well recognized that in original installations it is difficult most of the time to connect a union joint that will not leak when rubber gaskets and the like are used. If the rubber gasket leaks in the joint after the test with water pressure is applied, then said pressure must be turned off, the joint disconnected and candle-wicking or packing must be added to the rubber washer or gasket in order to keep the joint from leaking, and this process must be repeated sometimes a number of times to obtain a leak-proof joint. This type of joint, furthermore, has a tendency to quickly deteriorate, especially at the present time when substitute materials are employed for rubber and similar packing materials, so that within the course of short periods repairs must be made.

By the use of the lead material in the invention herein disclosed, the lasting qualities are practically 100%, and the connection may be thus termed a permanent connection as distinguished from what is customarily employed in the trade as a connection at this time.

So far as we are aware, it may be stated that we believe we are the first to provide what is herein referred to as a double seal, an important feature of the formation of the gasket with a shoulder intermediate the tapered or conical seats thereof, and by making the angle of taper with reference to the axis low, the deformation of this gasket is made more easily effective to accomplish the sealing when the gasket seats are arranged to cooperate with substantially corresponding low angle conical seats in the compression members.

What is claimed is:

1. A coupling of the class described, comprising a pair of compression members, one of which is internally threaded at one end and formed with an internal conical seat at its other end of a low angle relative to the axis of said member, said compression member also having a radial abutment shoulder between said threaded portion and said conical seat, the other of said compression members being externally threaded and formed with an internal conical seat and abutment shoulder, and a gasket of deformable material, such as lead, provided with a cylindrical bore therethrough to receive a cylindrical pipe or shaft and conical end faces tapering at an angle substantially corresponding to the conical seats of the compression members, said conical faces terminating their bases in an annular flange adapted to be compressed against the abutment shoulders of the compression members, as the conical end is compressed against the pipe or shaft, when the said compression members are screwed home to effect a leak-proof connection.

2. A pipe or shaft coupling as set forth in claim 1, wherein the gasket member is formed at each end with a low angle tapering face and the abutment shoulder is formed centrally thereof between said faces, combined with a third compression member arranged between the said pair of compression members, said third member being provided with an internal tapering seat at each end substantially conforming to the low angle of the gasket ends.

3. A pipe or shaft coupling of the class described, comprising a pair of compression members, each of which is formed at one end with a conical seat of a low angle relative to the axis of said member and a radial abutment shoulder at the end of said seat, a third compression member adapted to be arranged between said first-mentioned compression members and having at each end a conical gasket seat substantially conforming to the seats of the other compression members, gaskets of deformable material, such as lead, each provided with a cylindrical bore therethrough to receive a cylindrical pipe or shaft, and opposed conical end faces tapering at a low angle substantially corresponding to the conical seats of said compression members, each said gasket having an annular flange between its tapering or conical end seats adapted to be compressed against the abutment shoulders of the associated compression members as the conical ends of said gasket are compressed against the pipe or shaft, said compression members being provided with means for drawing the same together and deforming the gaskets.

ALBERT MARS.
MICHAEL M. MARS.

REFERENCES CITED

The following references are of record in the file of this patent:

UNITED STATES PATENTS

| Number | Name | Date |
|---|---|---|
| 2,158,757 | Kuestermeier | May 16, 1939 |
| 1,489,065 | Clifton | Apr. 1, 1924 |
| 1,369,301 | Rarig | Feb. 22, 1921 |
| 1,925,533 | Havens | Sept. 5, 1933 |
| 610,321 | Davey | Sept. 6, 1898 |
| 811,908 | Dossert | Feb. 6, 1906 |
| 1,904,866 | Kreidel | Apr. 18, 1933 |
| 1,468,639 | Kimmel | Sept. 25, 1923 |
| 1,359,142 | Allison | Nov. 16, 1920 |
| 1,327,106 | Leahy | Jan. 6, 1920 |